United States Patent [19]

Armour et al.

[11] 4,334,602

[45] Jun. 15, 1982

[54] FRICTION CONTROLLER

[75] Inventors: John S. Armour, Farnborough; Peter M. F. Watson, Wokingham, both of England

[73] Assignee: The Minister of Transport in Her Britannic Majesty's Government of the United Kingdom of Great Britain and Northern Ireland, London, England

[21] Appl. No.: 136,218

[22] Filed: Apr. 1, 1980

[30] Foreign Application Priority Data

Sep. 26, 1979 [GB] United Kingdom ................ 7933380

[51] Int. Cl.³ .......................... B60T 8/04; F16D 43/24
[52] U.S. Cl. ............................ 192/103 F; 188/181 A; 192/56 E; 303/97
[58] Field of Search .................. 192/4 A, 56 F, 85 R, 192/103 C, 103 F, 103 R; 188/181 A; 303/95, 97

[56] References Cited

U.S. PATENT DOCUMENTS

| 2,995,957 | 8/1961 | Wilson et al. | 192/103 F X |
| 3,437,188 | 4/1969 | Long | 192/103 F |
| 3,833,097 | 9/1974 | Holst | 188/181 A |
| 4,183,588 | 1/1980 | Snyder | 188/181 A X |
| 4,260,201 | 4/1981 | Farr | 188/181 A X |

FOREIGN PATENT DOCUMENTS 2037971 3/1971 Fed. Rep. of Germany ... 188/181 A

Primary Examiner—Rodney H. Bonck

Attorney, Agent, or Firm—Pollock, Vande Sande & Priddy

[57] ABSTRACT

The invention is concerned with the rapid release of frictional force which is acting to reduce relative movement between contacting surfaces, the normal actuating means being unaffected. One application is in an antilock braking system in vehicles, particularly motorcycles. A sensor monitors wheel angular velocity, calculates deceleration and when this exceeds a predetermined value the sensor causes ultrasonic vibrations to be applied to brake pads effectively reducing friction without release of brake operating pressure to enable resumption of normal rotation. A short duration dc pulse of appreciable magnitude may be applied to the transducer at the onset of the normal input signal to produce a short duration surge to rapidly break the frictional force between the friction member and the moveable member to enhance speed of release. The transducer may also be applied directly to the end wall of a friction member hydraulic operating cylinder when ultrasonic vibrations will be transmitted through the operating fluid to the piston connected to the friction member. The end wall of the cylinder is of a suitable matching material to facilitate transmission of the ultrasonic energy, and the piston is formed so as to minimize attenuation.

The invention can also be applied to friction clutches operating in either rotary or linear senses to cause release when overloading or overspeeding occurs or to give gradual engagement in accordance with a predetermined program.

15 Claims, 1 Drawing Figure

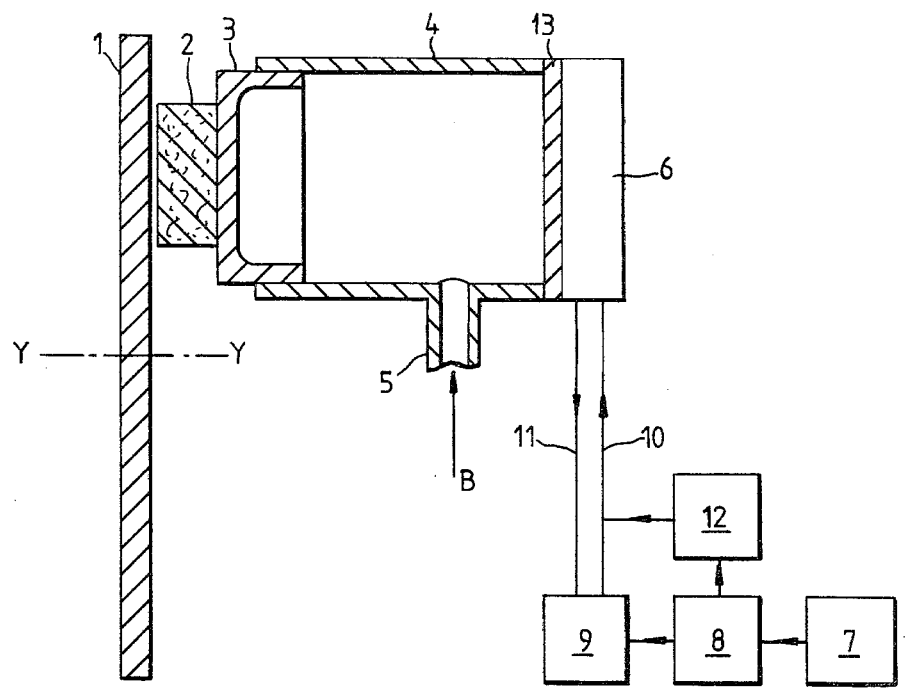

FRICTION CONTROLLER

The invention relates to friction controllers whereby frictional forces in brakes, clutches and the like may be varied independently of the normal operating mechanism.

The invention can advantageously be applied to vehicle braking systems, and as a slipping clutch in mechanisms transmitting power or control movements, for example winches on cranes etc, but is not limited to these functions.

The invention provides a means of reducing frictional forces in controlled manner by utilizing the known effect of the application of ultrasonic vibration.

A friction controller assembly according to the invention includes a movable member, a friction member arranged to engage the movable member and a sensor connected to apply ultrasonic vibration to at least one of the members.

In one embodiment, the movable member is a disc connected to a wheel, the friction member is a brake pad and the sensor is arranged to monitor the angular velocity of the wheel on brake application and to apply ultrasonic vibrations to the brake pad when the angular deceleration exceeds a predetermined value.

In another embodiment, the movable and friction members are coacting clutch elements.

The single FIGURE of the drawing shows the invention in diagrammatic form.

Embodiments of the invention will now be described, by way of example only, with reference to the accompanying diagrammatic drawing which shows a friction controller arranged in accordance with the invention. A metal disc 1 is mounted for rotation about its axis Y-Y and is disposed so that it can be contacted on one side face by a pad 2 of a material having a high coefficient of friction. The pad 2 is in contact with a piston 3 moving axially along a cylinder 4 which normally contains a hydraulic (ie incompressible) fluid. The admission of further fluid under pressure by way of an inlet 5, as indicated by the arrow B will act to urge the pad 2 into contact with the face of the disc 1 thereby engendering a frictional force between them. In one connotation, the disc will be connected to a wheel of a vehicle and a braking force will thus be applied to the wheel. Alternatively, the disc may comprise the driven member of a clutch mechanism and as such will be connected to a motor or other prime mover while the pad 2 and its associated piston and cylinder will serve to transmit power to a machine or other mechanism. (This arrangement can of course be arranged in the opposite sense with power being transmitted through the pad to the disc.)

Mounted at the end of the cylinder 4 remote from the piston/pad combination is a transducer 6, preferably of the piezo-electric variety though a magnetostrictive transducer may be used as an alternative.

A sensor 7 is connected by way of a function generator 8 to an ultrasonic generator 9 which is connected in turn by way of wires 10, 11 to the transducer 6. An additional output from the function generator 8 passes by way of a dc pulser 12 to the wire 10 which also serves to conduct the output of the ultrasonic generator 9 to the transducer 6.

In the case of a vehicle braking system, the sensor 7 is arranged to monitor the angular velocity of the wheel to which the disc 1 will be connected during such time as brake application is made. If the wheel decelerates at a rate greater than a predetermined setting (usually 1 g), a signal will be applied to the ultrasonic generator 9 which thereupon excites the transducer 6 which produces ultrasonic vibrations which are transmitted through the fluid in the cylinder (by virtue of its incompressible nature) to the piston 3 and the pad 2. The vibration has the known effect of reducing the frictional force between the pad and the disc 1. The wheel will recover velocity when the sensor ceases to apply a signal to the ultrasonic generator and normal brake force will be reapplied.

This sequence of operations continues repetitively whenever there is a tendency to wheel locking until the vehicle either stops or brakes are released.

By this means the braking force applied by the pad or pads 2 is maintained to the maximum degree possible. This can be especially important during "emergency" situations when a road surface is wet and slippery, and optimum control, particularly of a motor-cycle, can be maintained.

The system is independent of the normal brake actuating means and there is a minimum time lag in its operation which is more rapid than that which might be reasonably expected where the brake actuating means are intermittently applied and released.

It is known in ultrasonic transducers, particularly of the piezo-electric type, to apply a dc bias to the oscillatory input signal in order to provide more definite response and the dc pulser 12 is provided for this purpose. Additionally, the function generator 8 comprises a starter and dc pulse timer whereby the onset of a signal from the sensor 7 causes a dc pulse of duration equal to one or two cycles at an operating frequency of $\simeq$ 20 kHz, and of greater magnitude than the normal dc bias, to be fed to the transducer 6 effectively simultaneously with the output from the ultrasonic generator 9. This produces a surge which will rapidly break any friction bond likely to exist between the pad 2 and the disc 1 without the need for build up of normal oscillations. This will give more rapid reduction of the frictional force than would normally be possible otherwise and thus a greater degree of control. An incidental advantage is that less power will be needed overall since the amplitude of the ultrasonic vibration can be less than if it were required to break the frictional bond unaided. The effect of the dc pulse is probably more pronounced in the case of a piezo-electric transducer where it will act to compress the crystal very rapidly but similar results have been achieved using a magnetostrictive transducer.

The end wall 13 of the cylinder 4 is of a suitable material eg stainless steel which will facilitate transmission of ultrasonic energy to the operating fluid in the cylinder and the piston 3 is appropriately formed according to its own characteristics and those of the operating fluid so as to minimize any attenuation of ultrasonic energy at the piston/fluid interface.

In the friction clutch mode, the arrangement is virtually the same as already described except that the sensor 7 is arranged to detect other undesirable conditions such as overloading eg by strain gauge, or overspeed whereby the application of ultrasonic vibrations allows the clutch to slip during such time as the adverse conditions are maintained.

Very precise control of a clutch is obtainable by the use of a function generator 9 by which the input to the ultrasonic generator may be varied to give gradual engagement thus:

a. partial engagement to provide slip;

b. partial engagement prior to full engagement to lessen shock loading of driving unit and/or transmission;

c. movement towards full engagement in a pre-programmed manner, ie to engage in accordance with a linear or non-linear function maintaining the speed of a driven load within specified limits might best be achieved using a conventional closed loop control system but it may be advantageous to allow the clutch to slip while varying the speed of the driving means.

The sensor 7 can be arranged to detect any appropriate signals, analogue or digital, representing torque, temperature or other measurable predictable parameter.

We claim:

1. A friction controller assembly comprising a rotatable disc member, a pad of high friction material arranged selectively to contact the disc member, a transducer disposed so as to apply ultrasonic vibration to the pad, a sensor adapted to monitor an external parameter and connected to apply a signal to the transducer, and an ultrasonic generator and another funtion generator in circuit between the sensor and the transducer.

2. A friction controller assembly according to claim 1 in which the disc member is connected to a wheel and the sensor is adapted to monitor the angular velocity of the wheel.

3. A friction controller assembly according to claim 1 or claim 2 in which the transducer is of magnetorestrictive type.

4. A friction controller assembly according to claim 1 or claim 2 in which the transducer is of piezo-electric type.

5. A friction controller according to claim 1 in which the function generator acts to vary the input to the ultrasonic generator.

6. A friction controller according to claim 1 in which the function generates has an additional output connected by way of a dc pulser to the transducer.

7. A friction controller assembly according to claim 1 in which the pad is urged into contact with the disc by hydraulic means and ultrasonic vibration is transmitted to the pad through the agency of hydraulic fluid.

8. A friction controller assembly according to claim 7 in which the pad is mounted on a piston operating in a hydraulic cylinder and the transducer applies ultrasonic vibration to hydraulic fluid in the cylinder.

9. A vehicle braking system comprising a wheel, a pad arranged to apply frictional force to the wheel, and means for automatically applying ultrasonic vibration to the pad when the angular deceleration of the wheel exceeds a predetermined value.

10. A vehicle braking system according to claim 9 comprising a disc arranged to rotate with the wheel the pad being disposed to be urged into contact with the disc, a sensor operative to monitor the angular velocity of the wheel and to calculate the deceleration of the wheel, and a transducer disposed to apply ultrasonic vibration to the pad in response to an output signal from the sensor.

11. A vehicle braking system according to claim 10 including a hydraulic actuator, the pad being mounted on a piston of said actuator, and the transducer being disposed to apply ultrasonic vibration to the end wall of the cylinder of said actuator in which the piston operates.

12. A vehicle braking system according to claim 11 in which said end wall is fabricated of a material which will facilitate transmission of ultrasonic energy.

13. A vehicle braking system according to claim 10 in which means are provided to feed a dc pulse to the transducer at the onset of a signal from the sensor.

14. A friction clutch including a movable member, a friction member arranged to engage the movable member, a transducer connected to apply ultrasonic vibration to the friction member, and a function generator to vary the ultrasonic vibrations whereby clutch engagement may be modified.

15. A friction clutch according to claim 14 further comprising a hydraulic actuator, the friction member being mounted on a piston of the actuator, and the transducer being positioned to apply ultrasonic vibration to the end wall of a cylinder of said actuator in which the piston operates.

* * * * *